Patented Mar. 8, 1932

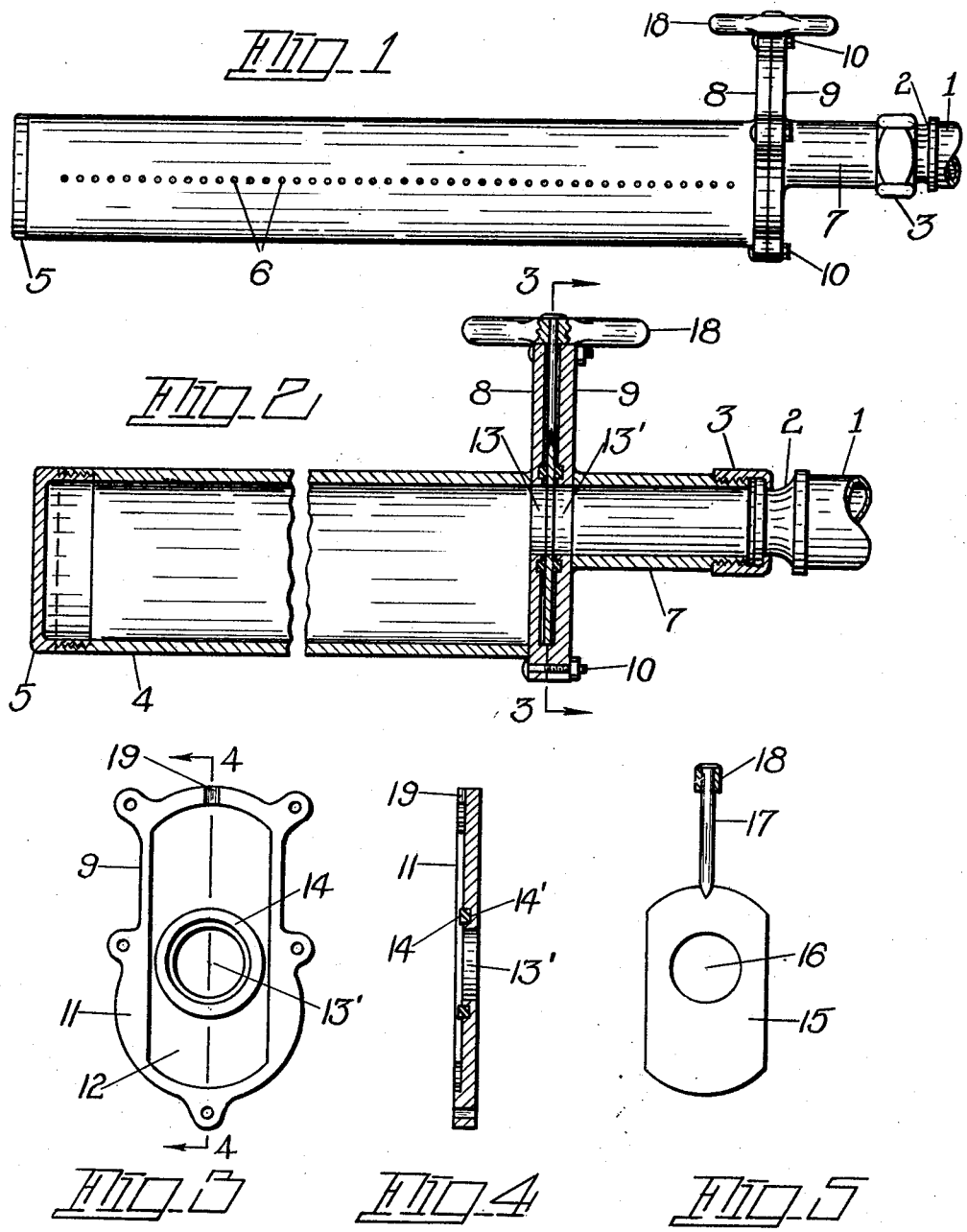

1,848,948

UNITED STATES PATENT OFFICE

MAX F. GROSSER, OF SEATTLE, WASHINGTON

SPRINKLER

Application filed July 1, 1929. Serial No. 375,054.

My present invention relates to an improved sprinkler or distributing nozzle, which while adapted for various uses, is particularly designed for use with lawn and garden hose for watering flowers, plants, vegetables &c. The primary object of the invention is the provision of a device of this character that may be manipulated with facility, or may be set in place on the lawn, for sprinkling or watering the vegetation, and one of the essential accomplishments of the device is its ability to distribute the water in a multiplicity of small streams so that delicate flowers, plants &c. may be watered without subjecting them to high water pressure or to dense volume of water, which would otherwise damage the plants and wash away the soil from the roots of the plants.

The invention consists in certain novel combinations and arrangements of parts in the structure of the sprinkler involving its chambered sprinkling or distributing head and the valve control therefor, as will hereinafter be more fully set forth and claimed. In the accompanying drawings I have illustrated one complete example of the physical embodiment of my invention wherein the parts are combined and arranged according to the best mode I have thus far devised for the practical application of the principles of my invention.

Figure 1 is a view in side elevation of the sprinkler involving my invention. Figure 2 is a longitudinal sectional view with the distributing head broken away for convenience of illustration. Figure 3 is a transverse sectional view at line 3—3 of Figure 2. Figure 4 is a transverse sectional view at line 4—4 of Figure 3, and Figure 5 is a face view of the control valve.

In Figures 1 and 2 I have shown the sprinkler as attached to the end of a garden hose 1 by means of the usual nipple 2 and the coupling nut 3, and it will be understood that the device of my invention is adapted for use with the standard hose and hose coupling.

The sprinkler head 4 is of cylindrical shape and of suitable diameter and length for the purpose, and the front end of the hollow head which forms a distributing chamber, is closed by a screw cap 5 threaded on the end of the cylinder. The sprinkler head is provided with one or more longitudinally extending rows of outlet ports 6 in its wall, through which the water is distributed in numerous fine streams, laterally of the head, and an inlet pipe 7 is provided at one end of the head, said pipe being offset from the center of the head as shown. The water is thus introduced into the distributing chamber within the head under normal pressure from the hose, and a sufficient head of water is provided to force the fine streams through the ports 6 in order that the water may be "showered" by manipulating the sprinkler at the end of the hose. Or the sprinkler may be set on the lawn with the row of ports in position to send out the spray in the form of a fountain so that the streams will rise and then fall to the ground for watering purposes.

Between the inlet pipe 7 and the sprinkling head or distributing chamber, a valve casing is interposed, said casing comprising a plate 8 that is welded to the open end of the sprinkler head, and a complementary plate 9 that may be welded to the inlet pipe, said plates being jointed together by means of bolts 10. The adjoining faces of the plates are provided with complementary edge flanges 11 that form between the plates the valve chamber 12 opening into the inlet pipe through 13' and through port 13 to the distributing chamber or interior of the sprinkling head. The inlet port is made up of two circular openings 13 and 13' in the respective plates 8 and 9 and about these openings packing rings 14 are seated in annular grooves 14' in the adjoining faces of the plates to prevent leakage.

A slide valve 15 having a circular transverse port 16 is movable in the valve chamber between the plates, and the valve port of course is adapted to register with the inlet port. By means of a stem 17 and the handle 18 on the exterior end of the stem, the valve may be moved to vary the area of the valve port, and the walls of the valve chamber are provided with an opening 19 for the movement of the stem.

It will be apparent that the volume of water from the inlet pipe to the distributing chamber of the sprinkler head may be varied as desired, and that the water is admitted to the distributing chamber remote from the outlet ports in order that turbulency of water near the ports may be reduced for the purpose of enhancing the distribution of the water through the outlet ports.

The device as thus described and shown is simple in both construction and operation, is durable and rugged and not likely to become deranged. From time to time the cap 5 may be removed for the purpose of gaining access to the interior of the sprinkler head and the outlet ports may be cleansed when necessary.

Having thus fully described my invention, what I claim as new and desire to secure by Letters Patent is:—

1. A sprinkling device consisting of an inlet pipe; a sprinkler head of much greater cross-sectional area than the inlet pipe; the axis of the said inlet pipe being offset from the axis of the sprinkler head placing the pipe at the uppermost point of the sprinkler head; a slide valve, disposed between said inlet pipe and the sprinkler head, so arranged that the valve opening is at the uppermost point of the sprinkler head; and a plurality of outlet ports disposed remotely from the axis of the inlet pipe.

2. A sprinkling device consisting of an inlet pipe; a sprinkler head of much greater cross-sectional area than the inlet pipe; the axis of the said inlet pipe being offset from the axis of the sprinkler head placing the pipe at the uppermost point of the sprinkler head; a ported end plate for said sprinkler head; a ported end plate on said inlet pipe; said ported end plates being recessed to provide a slideway for a valve member and further having annular grooves around their ports which are adapted to secure packing rings in place; a ported slide valve disposed within said slideway and adapted to close when in its uppermost position; and a plurality of outlet ports disposed remotely from the axis of the inlet pipe.

In testimony whereof I affix my signature.

MAX F. GROSSER.